US012691845B2

(12) United States Patent
    Ohno et al.

(10) Patent No.: US 12,691,845 B2
(45) Date of Patent: Jul. 28, 2026

(54) SEAT-MOUNTED AIRBAG DEVICE

(71) Applicant: TOYOTA JIDOSHA KABUSHIKI KAISHA, Aichi-ken (JP)

(72) Inventors: Mitsuyoshi Ohno, Miyoshi (JP); Toshiki Iwama, Toyota (JP); Tatsuya Hashido, Aichi-ken (JP); Yu Suzuki, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/774,924

(22) Filed: Jul. 17, 2024

(65) Prior Publication Data

US 2025/0058735 A1 Feb. 20, 2025

(30) Foreign Application Priority Data

Aug. 14, 2023 (JP) ................................. 2023-132160

(51) Int. Cl.
B60R 21/233 (2006.01)
B60R 21/207 (2006.01)

(52) U.S. Cl.
CPC .......... B60R 21/233 (2013.01); B60R 21/207 (2013.01); *B60R 2021/2074* (2013.01); *B60R 2021/23308* (2013.01)

(58) Field of Classification Search
CPC .. B60R 2021/2074; B60R 2021/23308; B60R 2021/23324; B60R 2021/2612; B60R 2021/2615; B60R 21/207; B60R 21/233; B60R 21/261
See application file for complete search history.

(56) References Cited

U.S. PATENT DOCUMENTS

| | | | | |
|---|---|---|---|---|
| 9,533,651 B1 * | 1/2017 | Ohno | ..................... | B60N 2/914 |
| 9,919,673 B2 * | 3/2018 | Ohno | ................. | B60R 21/2338 |
| 9,925,943 B2 * | 3/2018 | Ohno | ................... | B60R 21/237 |
| 9,944,246 B2 * | 4/2018 | Ohno | .............. | B60R 21/23138 |
| 10,005,417 B2 * | 6/2018 | Ohno | ................. | B60R 21/2334 |
| 10,071,702 B2 * | 9/2018 | Ohno | ................... | B60R 21/207 |
| 10,077,058 B2 * | 9/2018 | Ohmi | ................. | G05D 1/0055 |
| 10,093,266 B2 * | 10/2018 | Sugie | ................... | B60R 21/207 |
| 10,099,643 B2 * | 10/2018 | Sakakibara | ............ | B60N 2/686 |
| 10,202,095 B2 * | 2/2019 | Ohno | ................... | B60R 21/215 |

(Continued)

FOREIGN PATENT DOCUMENTS

| | | | | |
|---|---|---|---|---|
| DE | 102017131121 A1 * | 6/2019 | ........ | B60R 21/2334 |
| JP | 2017-030373 A | 2/2017 | | |

(Continued)

*Primary Examiner* — Laura Freedman
(74) *Attorney, Agent, or Firm* — HAUPTMAN HAM, LLP

(57) ABSTRACT

A seat-mounted airbag device including an inflator that is provided at a vehicle seat and that ejects gas during a vehicle collision; and an airbag including an airbag body that, by being supplied with gas ejected from the inflator, moves toward a seat front side through between a head of a passenger seated on a vehicle seat and a ceiling of a vehicle cabin, and is expanded and deployed, so as to be disposed at the seat front side of the passenger, wherein the airbag is housed in the headrest with both seat width direction end portions fold-bent toward a seat downward side, so as to follow an external profile of a headrest of the vehicle seat in face-on view seen from the seat front side.

9 Claims, 16 Drawing Sheets

(56)                    References Cited

U.S. PATENT DOCUMENTS

| | | | | | |
|---|---|---|---|---|---|
| 10,315,606 | B2 * | 6/2019 | Ohno | .................... | B60R 21/207 |
| 10,322,691 | B2 * | 6/2019 | Ohmi | .................... | B60R 21/231 |
| 10,328,889 | B2 * | 6/2019 | Sugie | ................ | B60R 21/01552 |
| 10,471,918 | B2 * | 11/2019 | Sugie | .................... | B60R 21/207 |
| 10,899,307 | B2 * | 1/2021 | Lin | ...................... | B60N 2/0268 |
| 10,974,680 | B2 * | 4/2021 | Ohmi | ................ | B60R 13/0212 |
| 11,738,706 | B2 * | 8/2023 | Ohno | ................ | B60R 21/23138 |
| | | | | | 280/730.2 |
| 11,745,686 | B2 * | 9/2023 | Ohno | .................... | B60R 21/207 |
| | | | | | 280/728.2 |
| 11,745,693 | B2 * | 9/2023 | Ohno | .................... | B60R 21/237 |
| | | | | | 280/730.2 |
| 11,760,297 | B2 * | 9/2023 | Ohno | ................. | B60R 21/2338 |
| | | | | | 280/728.2 |
| 11,904,790 | B2 * | 2/2024 | Yamamoto | ............ | B60R 21/207 |
| 12,043,195 | B2 * | 7/2024 | Ohno | .................... | B60R 21/233 |
| 12,043,200 | B2 * | 7/2024 | Ohno | ................. | B60R 21/2338 |
| 12,145,526 | B2 * | 11/2024 | Yamamoto | .......... | B60R 21/2338 |
| 12,522,168 | B2 * | 1/2026 | Ohno | ................ | B60R 21/01554 |
| 2017/0028955 | A1 | 2/2017 | Ohno et al. | | |
| 2017/0136976 | A1 | 5/2017 | Ohno et al. | | |
| 2019/0016293 | A1 | 1/2019 | Saso | | |
| 2024/0123933 | A1 * | 4/2024 | Ohno | .................... | B60R 21/264 |
| 2024/0123934 | A1 * | 4/2024 | Ohno | ................ | B60R 21/23138 |
| 2024/0123935 | A1 * | 4/2024 | Ohno | ................. | B60R 21/2338 |
| 2024/0123936 | A1 * | 4/2024 | Ohno | .................... | B60R 21/207 |
| 2024/0123937 | A1 * | 4/2024 | Ohno | ................. | B60R 21/2338 |
| 2024/0123940 | A1 * | 4/2024 | Ohno | .................... | B60R 21/207 |

FOREIGN PATENT DOCUMENTS

| | | | |
|---|---|---|---|
| JP | 2017-094767 | A | 6/2017 |
| JP | 2019-018593 | A | 2/2019 |
| JP | 2019-218013 | A | 12/2019 |

* cited by examiner

FIG.1

SEAT-MOUNTED AIRBAG DEVICE

CROSS-REFERENCE TO RELATED APPLICATION

This application claims priority under 35 USC 119 from Japanese Patent Application No. 2023-132160, filed on Aug. 14, 2023, the disclosure of which is incorporated by reference herein.

BACKGROUND

Technical Field

The present disclosure relates to a seat-mounted airbag device.

Related Art

A hitherto known airbag device includes an airbag provided with a rear expansion portion that deploys toward a back face side of a seat, a pair of side expansion portions that extend forward from both left and right sides of the rear expansion portion, and a pair of front expansion portions that extend toward a center from the side expansion portions so as to be coupled together at the center and to cover in front of a passenger (see, for example, Japanese Patent Application Laid-Open (JP-A) No. 2019-218013).

Moreover, another hitherto known airbag device includes a bag body provided with a trunk support portion to be deployed in front of a passenger from the rear of the head of the passenger, and a pair of head support portions to be deployed toward the left and right sides of the head of the passenger and to connect to the trunk support portion (see, for example, JP-A No. 2019-018593). In a deployed state of this bag body, an escape portion for the head of the passenger to escape into is formed so as to penetrate in the height direction between the pair of head support portions.

In airbag devices such as described above, the airbag (bag body) is to be disposed at the front side of the passenger by expanding and deploying from a seatback while passing through a gap between the head of the passenger and a ceiling. However, when trying to install such an airbag to the seatback so as not to impede the deployment performance of the airbag by, for example, rolling up in a rolled shape from being spread out flat, a seat width direction dimension of the airbag becomes about the same as the seat width direction dimension of the seatback. Moreover, when such an airbag is installed in the headrest vicinity, the dimension at the periphery thereof becomes large, lowering the rearview visibility of the passenger.

SUMMARY

The present disclosure provides a seat-mounted airbag device that may enable compact housing of an airbag including an airbag body, which is to be disposed at a seat front side of a passenger by being expanded and deployed through between the head of the passenger and a vehicle cabin ceiling, to be housed compactly without impeding the deployment performance of the airbag.

A first aspect of the present disclosure is a seat-mounted airbag device including: an inflator that is provided at a vehicle seat and that ejects gas during a vehicle collision; and an airbag including an airbag body that, by being supplied with gas ejected from the inflator, moves toward a seat front side through between a head of a passenger seated on a vehicle seat and a ceiling of a vehicle cabin, and is expanded and deployed, so as to be disposed at the seat front side of the passenger, wherein the airbag is housed in a headrest with both seat width direction end portions fold-bent toward a seat downward side, so as to follow an external profile of the headrest of the vehicle seat in face-on view seen from the seat front side.

In the first aspect, the airbag body moves toward the seat front side through between the head of the passenger seated on the vehicle seat and the vehicle cabin ceiling, and is expanded and deployed by being supplied with gas ejected from the inflator during a vehicle collision, so as to be disposed at the seat front side of the passenger. Note that reference to "during a vehicle collision" encompasses when the inevitability of a collision is foreseen (predicted).

The airbag including the airbag body is housed compactly in the headrest, with the two seat width direction end portions fold-bent toward the seat downward side, so as to follow the external profile of the headrest of the vehicle seat in face-on view looking from the seat front side. However, the two seat width direction end portions of the airbag deploy, while being pulled toward the seat width direction outside, during expansion and deployment. Thus, even though the two seat width direction end portions of the airbag are housed fold-bent toward the seat downward side, the two seat width direction end portions of the airbag are deployed, while the fold-bends are being unfolded during expansion and deployment.

Namely, in the present disclosure, even for an airbag including an airbag body to be disposed at a seat front side of a passenger, by being expanded and deployed through between the head of a passenger and a vehicle cabin ceiling, the airbag is able to be housed compactly in a headrest without impeding the deployment performance thereof. The headrest may thereby suppressed from becoming bulky in both face-on view and side view.

In a second aspect of the present disclosure, in the first aspect, the two seat width direction end portions of the airbag may be a pair of front-rear chambers that, by being supplied with gas ejected from the inflator, expand and deploy toward the seat front side via both left and right sides of the head of the passenger; and the airbag body moves toward the seat front side through between the head of the passenger and the ceiling as the pair of front-rear chambers are being expanded and deployed, and the airbag body may be expanded and deployed toward the seat rear side between the pair of front-rear chambers so as to be disposed at the seat front side of the passenger by being supplied with the gas from the pair of front-rear chambers.

In the second aspect, the two seat width direction end portions of the airbag are the pair of front-rear chambers that by being supplied with gas, ejected from the inflator, are expanded and deployed toward the seat front side via both left and right sides of the head of the passenger. The airbag body moves toward the seat front side through between the head of the passenger and the vehicle cabin ceiling, as the pair of front-rear chambers are being expanded and deployed, and is expanded and deployed toward the seat rear side between the pair of front-rear chambers, so as to be disposed at the seat front side of the passenger by being supplied with the gas from the pair of front-rear chambers. Namely, the airbag body expands and deploys toward the passenger with a delay to the pair of front-rear chambers. This means that the airbag body is compressively deformable toward the seat front side, while the front-rear chambers are being extended during passenger restraint, and the passenger restraint performance of the airbag body may be effectively secured.

In a third aspect of the present disclosure, in the second aspect, the pair of front-rear chambers may be fold-bent toward the seat downward side, from boundary portions with the airbag body.

In the third aspect, the pair of front-rear chambers are fold-bent toward the seat downward side from the boundary portions with the airbag body. These boundary portions have the lowest rigidity. The pair of front-rear chambers are accordingly easily fold-bent toward the seat downward side, facilitating an operation to install the airbag to the headrest.

In a fourth aspect of the present disclosure, in the third aspect, the headrest may be integrally formed with a seatback of the vehicle seat.

In the fourth aspect, the headrest is integrally formed to the seatback. This means that the airbag is prevented from coming away from the vehicle seat better, than cases in which the headrest is formed as a separate body from the seatback.

In a fifth aspect of the present disclosure, in the fourth aspect, left and right airbag doors, that are formed by the headrest rupturing during expansion and deployment of the pair of front-rear chambers, may be configured to turn in toward the head of the passenger.

In the fifth aspect, the left and right airbag doors formed by the headrest rupturing during expansion and deployment of the pair of front-rear chambers are configured so as to turn in toward the head of the passenger. This means that the head of the passenger is able to be moved toward the seat width direction center by the airbag doors, preventing the expansion and deployment of the pair of front-rear chambers from being impeded by the head of the passenger.

In a sixth aspect of the present disclosure, in the fourth or fifth aspect, the inflator may be a single inflator disposed along an extension direction of the seatback of the vehicle seat, and may be configured to eject the gas toward an inside of distribution piping capable of supplying the gas respectively to the pair of front-rear chambers.

In the sixth aspect, the inflator is a single inflator disposed along an extension direction of the seatback of the vehicle seat, and ejects gas toward the inside of the distribution piping capable of supplying the gas respectively to the pair of front-rear chambers. This means that the seatback may be suppressed from becoming bulky (from increasing in thickness) in side view, compared to cases in which there are two inflators provided along directions intersecting with the extension direction of the seatback to enable gas to be supplied directly to each of the pair of front-rear chambers, thereby achieving a reduction in manufacturing cost.

In a seventh aspect of the present disclosure, in the sixth aspect, ejection ports of the distribution piping, that are connected to basal portions of the pair of front-rear chambers, may each extend with a specific length toward a seat width direction outside and forward in plan view.

In the seventh aspect, the ejection ports of the distribution piping that are connected to the basal portions of the pair of front-rear chambers, each extend with the specific length toward the seat width direction outside and forward in plan view. This means that the expansion and deployment performance of the airbag (of the pair of front-rear chambers) is secured, even where there is some variation in the left-right direction position of the head of the passenger.

According to the above aspects, a seat-mounted airbag device of the present disclosure may enable an airbag including an airbag body, which is to be disposed at a seat front side of a passenger by being expanded and deployed through between the head of a passenger and a ceiling of a vehicle cabin, to be housed compactly without impeding the deployment performance of the airbag.

BRIEF DESCRIPTION OF THE DRAWINGS

Exemplary embodiments will be described in detail based on the following figures, wherein:

FIG. 1 is a schematic perspective view illustrating an airbag of a seat-mounted airbag device according to an exemplary embodiment in an expanded and deployed state;

DETAILED DESCRIPTION

Figure 2:
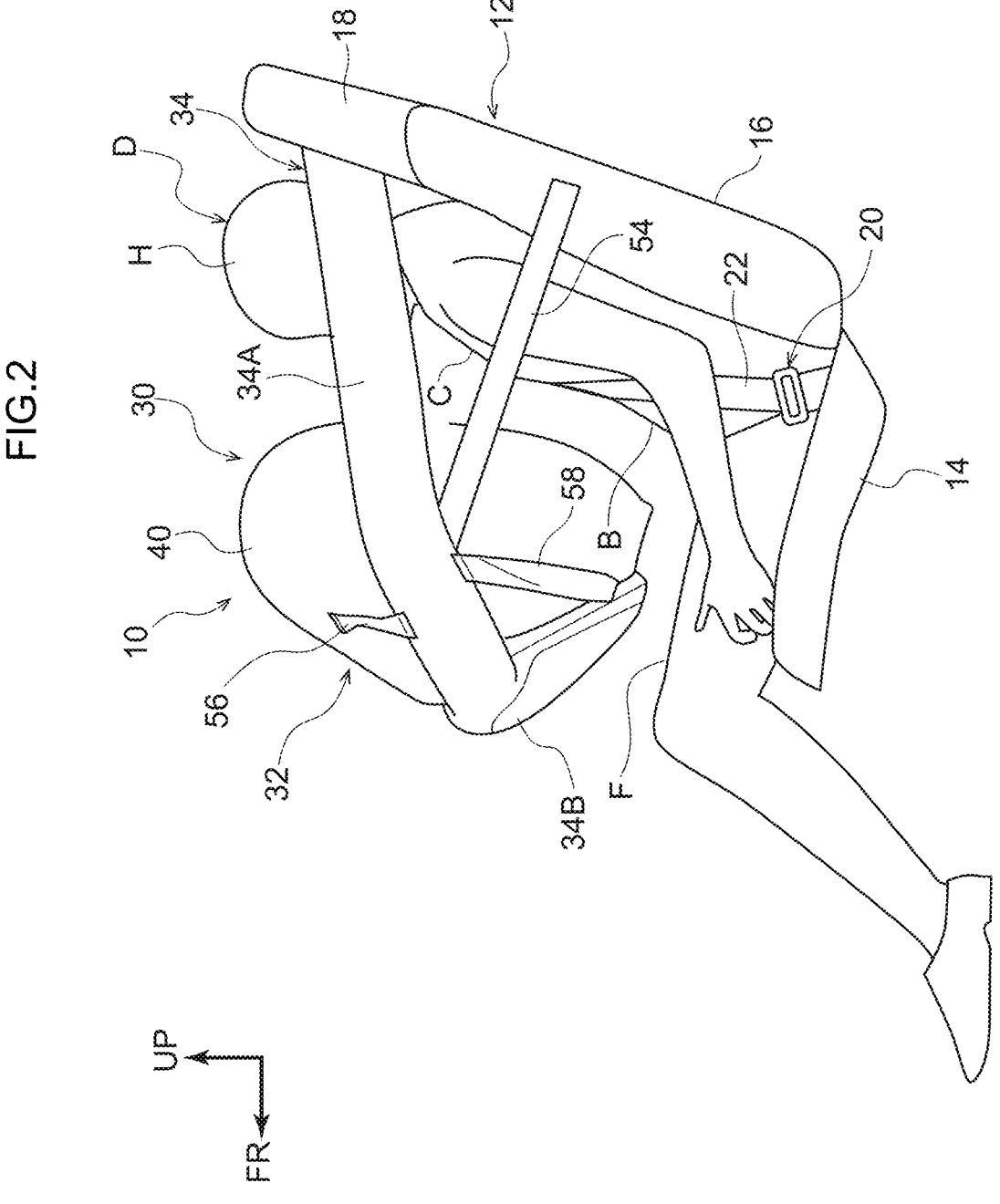
FIG. 2 is a schematic side view illustrating an airbag of a seat-mounted airbag device according to the present exemplary embodiment in an expanded and deployed state.

Detailed explanation follows regarding exemplary embodiments according to the present disclosure, with reference to the drawings. Note that, for ease of explanation, as appropriate in the drawings an arrow UP indicates an upward direction of a vehicle and a vehicle seat, an arrow FR indicates a forward direction of a vehicle and a vehicle seat, an arrow RH indicates a right direction of a vehicle and a vehicle seat, and an arrow LH indicates a left direction of a vehicle and a vehicle seat. Thus in the following description, unless stated otherwise, reference to up and down, front and rear, and left and right directions indicate up and down, front and rear, and left and right directions of a vehicle and a vehicle seat. Moreover, a left-right direction has the same definition as a vehicle width direction and a seat width direction.

Figure 1:
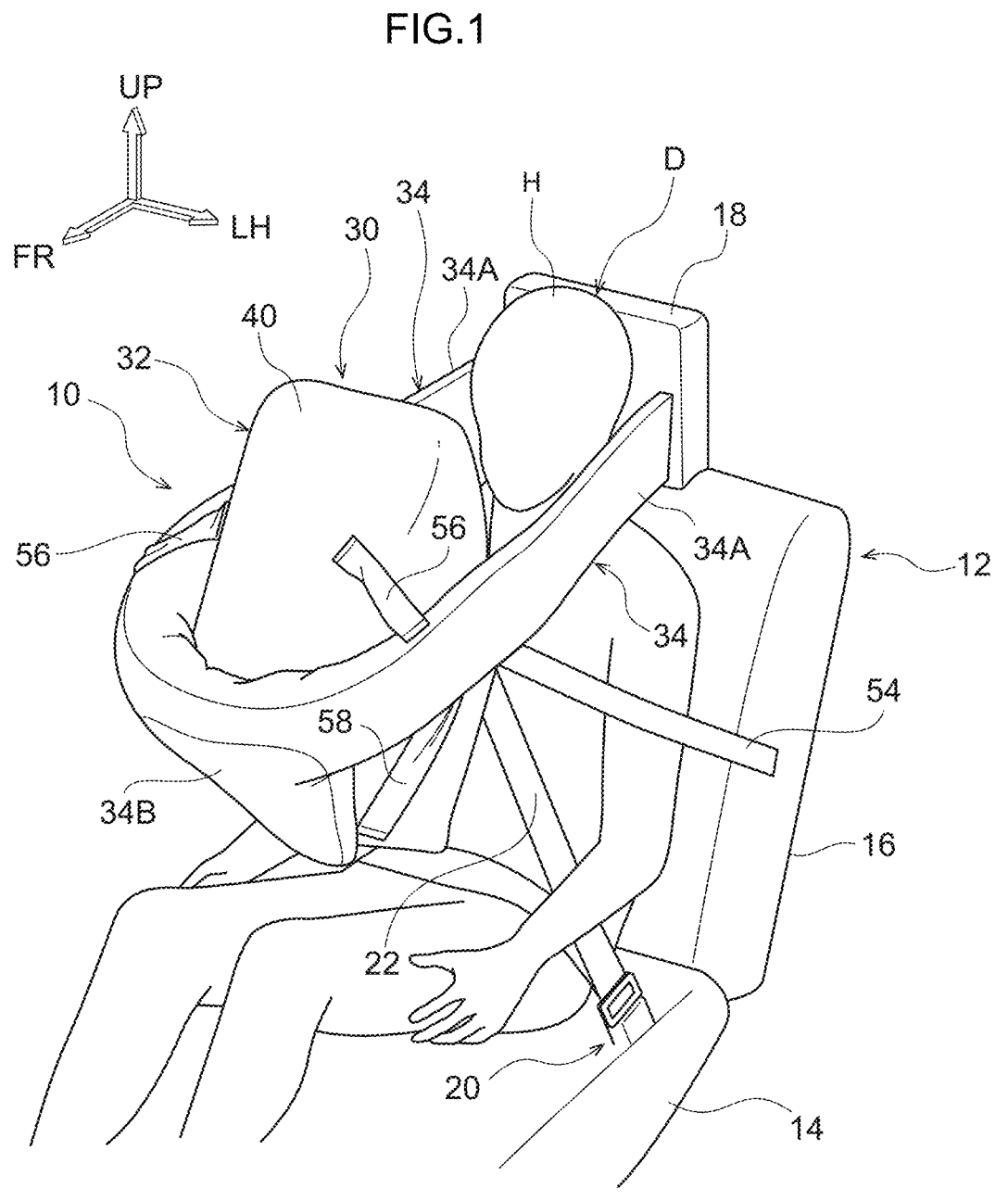

A passenger protection device 10 is, as illustrated in FIG. 1, configured including a vehicle seat 12, and a seat-mounted airbag device 30 according to the present exemplary embodiment (hereafter referred to simply as an "airbag device"). The vehicle seat 12 is a front seat or a rear seat of a vehicle (automobile). In this example the vehicle seat 12 is a rear seat and not a front seat 13 (see FIG. 12 to FIG. 14).

Figure 3:
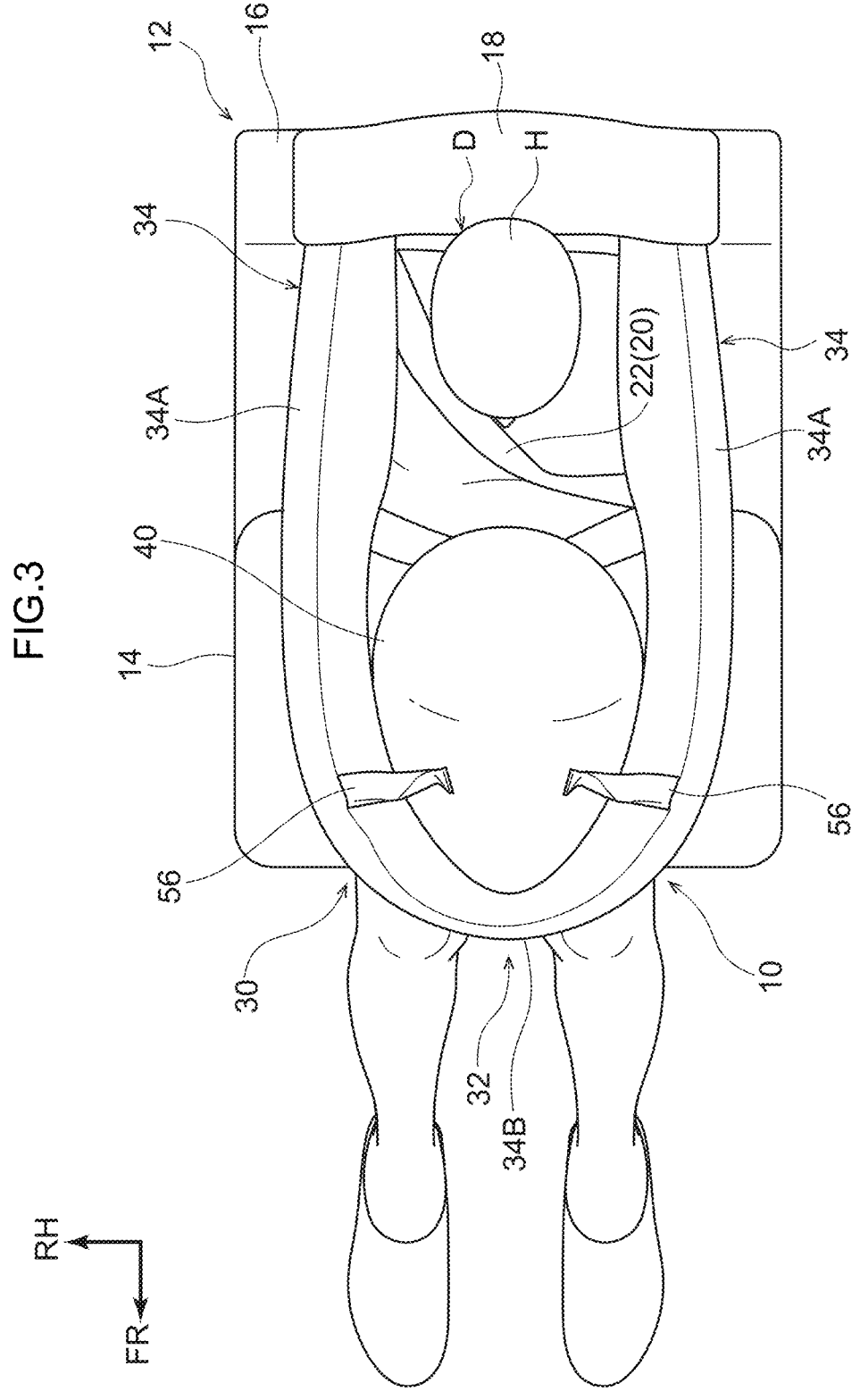
FIG. 3 is a schematic plan view illustrating an airbag of a seat-mounted airbag device according to the present exemplary embodiment in an expanded and deployed state.

Note that, a state is illustrated in FIG. 1 to FIG. 3 in which a crash test dummy (person dummy) is seated in the vehicle seat 12, as a model of a passenger (seated person) to be protected. The person dummy is, for example, an America male adult 50 percentile (AM50) head-on collision test dummy (Hybrid III). The person dummy is seated in a standard seated posture as determined by crash test method, and the vehicle seat 12 is positioned at a standard set position corresponding to the seated posture. For ease of explanation, the person dummy will hereafter be called "passenger D".

The vehicle seat 12 includes a seat cushion 14 for the passenger D to sit on (supporting the buttocks and thighs F of the passenger D), and a seatback 16 (supporting the back of the passenger D). The seatback 16 is provided so as to extend upward at a rear side of the seat cushion 14 in side view when looking along the seat width direction, and is configured so as to be capable of swinging about an axial direction along the seat width direction. The seatback 16 includes an integral headrest 18 that is provided at a seat width direction central portion of an upper end portion of the seatback 16 to support the head H of the passenger D. Note that a rear wall of the integral headrest 18 is configured by a backboard 19 (see FIG. 9 and FIG. 10).

As illustrated in FIG. 1 to FIG. 3, the passenger D seated on the seat cushion 14 of the vehicle seat 12 is configured so as to be restrained in the vehicle seat 12 by a seatbelt 22 provided to a seatbelt device 20. The seatbelt device 20 is a three-point seatbelt device, and is a so-called seat-mounted seatbelt device in which a non-illustrated retractor and anchor, and a buckle, are each provided to the vehicle seat 12.

Figure 7:
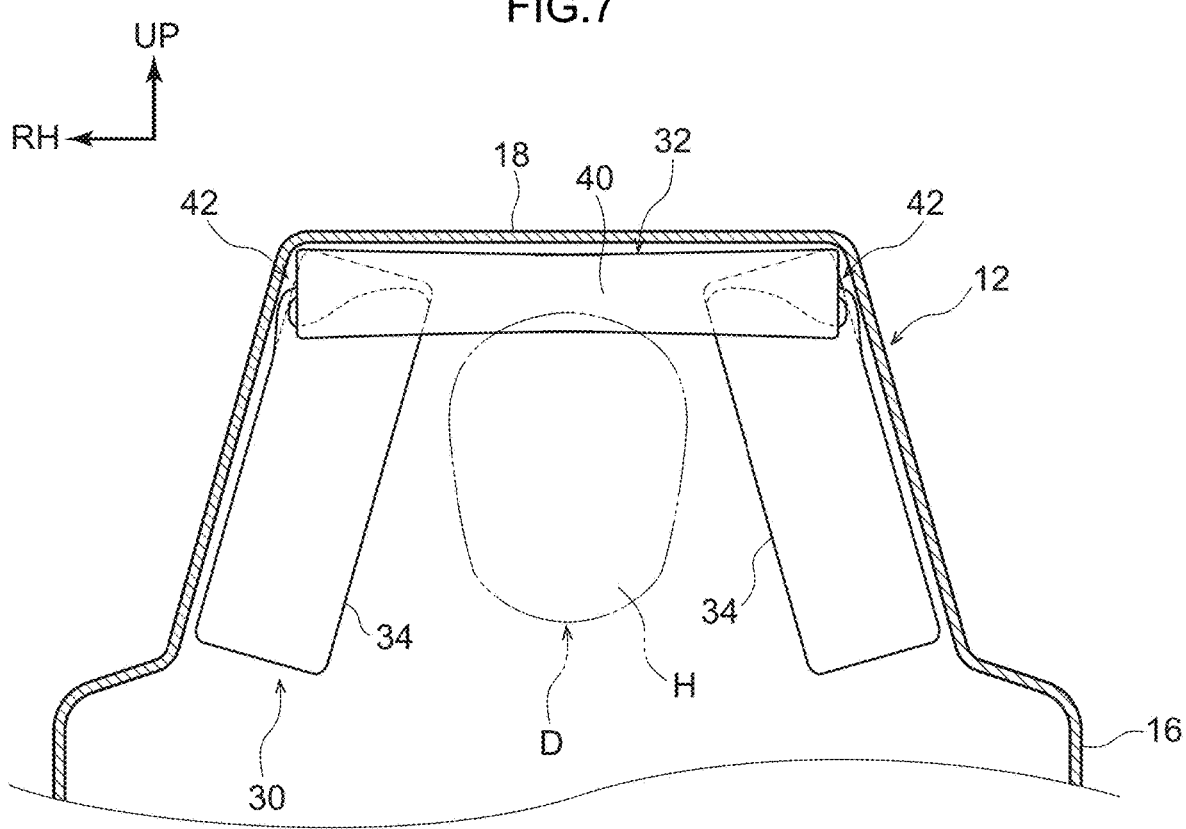
FIG. 7 is a schematic face-on view illustrating a partial cross-section of an airbag housed in a headrest of the present exemplary embodiment.
Figure 8:
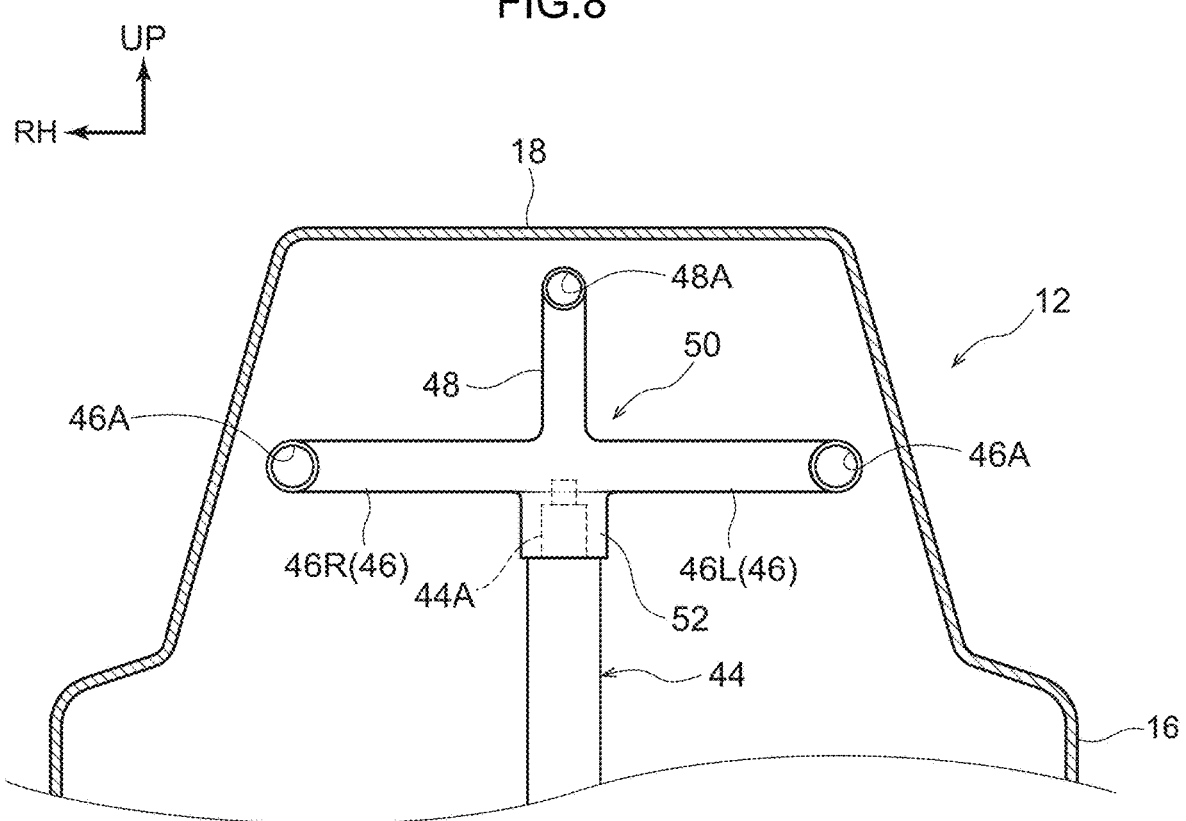
FIG. 8 is a schematic face-on view illustrating a shape of distribution piping in the present exemplary embodiment in a partial cross-section omitting an airbag.
Figure 9:
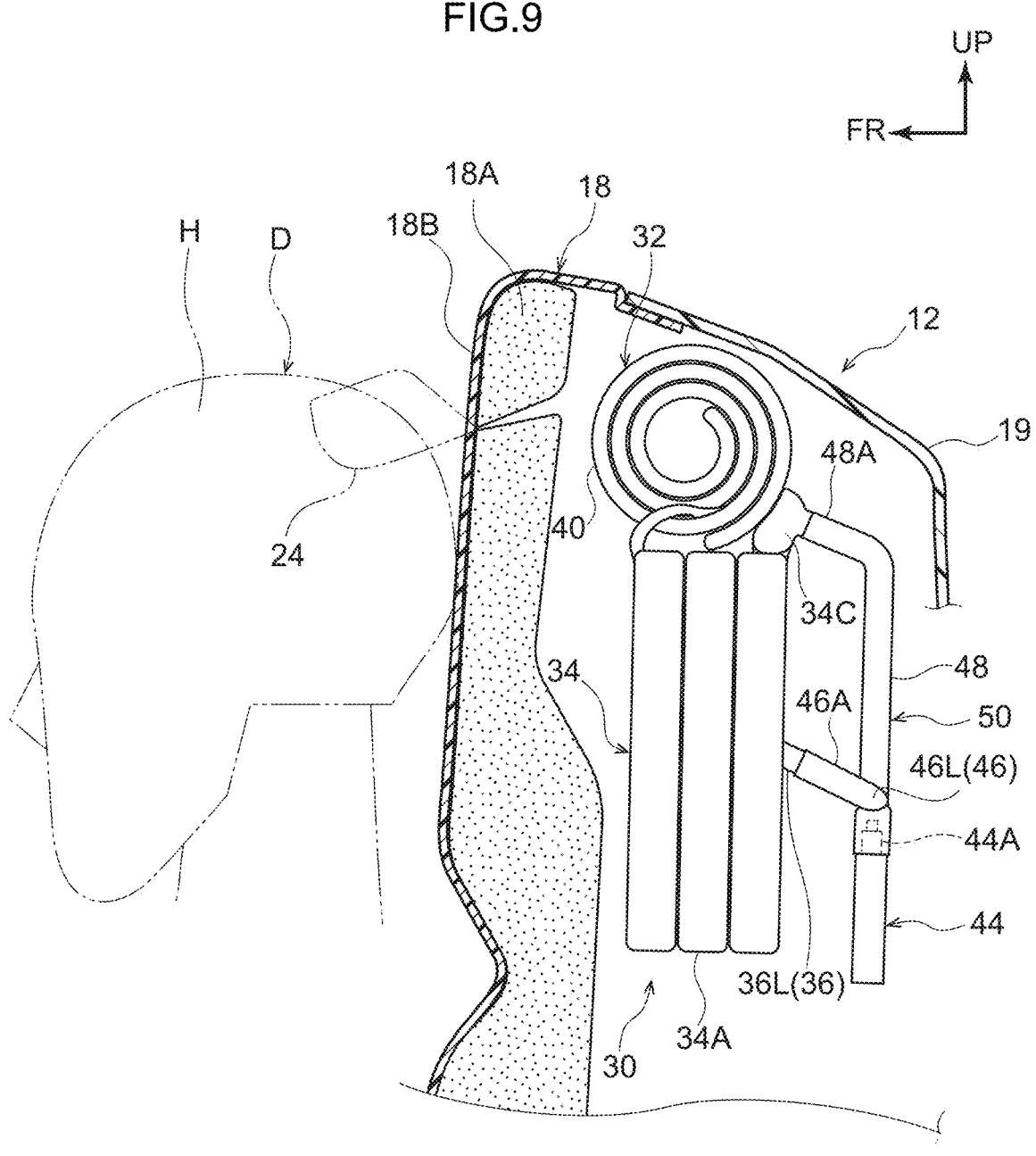
FIG. 9 is a schematic side view illustrating a partial cross-section of an airbag housed in a headrest of the present exemplary embodiment.

The airbag device 30 includes an airbag 32, and a single inflator 44 (see FIG. 8 and FIG. 9). The airbag 32 is normally housed inside the headrest 18 in a folded state (see FIG. 7, FIG. 9, and FIG. 10). The inflator 44 is, for example, either a combustion or cold gas type cylinder inflator formed in a substantially cylindrical shape, and is oriented along an extension direction of the seatback 16 (with an axial direction along the height direction), and is provided either inside the seatback 16, or so as to straddle from inside the seatback 16 to inside the headrest 18.

The airbag device 30 includes a non-illustrated control device (ECU) for controlling actuation of the inflator 44. The control device is electrically connected to the inflator 44 and to non-illustrated collision sensors (including a camera or the like), and is configured to be capable of detecting a head-on collision of the vehicle, or foreseeing the inevitability of a head-on collision. The control device is configured to actuate the inflator 44 when a vehicle head-on collision is detected or foreseen based on information from the collision sensors.

Namely, the inflator 44 is configured to generate gas and eject the gas from an ejection port 44A (see FIG. 8 and FIG. 9) on being actuated by the control device when a vehicle head-on collision is detected or foreseen (hereafter referred to as "during a vehicle head-on collision"). Note that, states of vehicle head-on collision when the control device actuates the inflator 44 include, in addition to a full head-on collision, offset head-on collisions such as an oblique collision or a small overlap collision or the like.

The airbag 32 is configured to be supplied with gas ejected from the inflator 44 and to be deployed and expanded from a front face of the headrest 18 toward the front side, via both left and right sides of the head H of the passenger D seated in the vehicle seat 12, and via the upper side of the head H of the passenger D. To explain more specifically, the airbag 32 includes a pair of front-rear chambers 34, and an airbag body 40.

Figure 4:
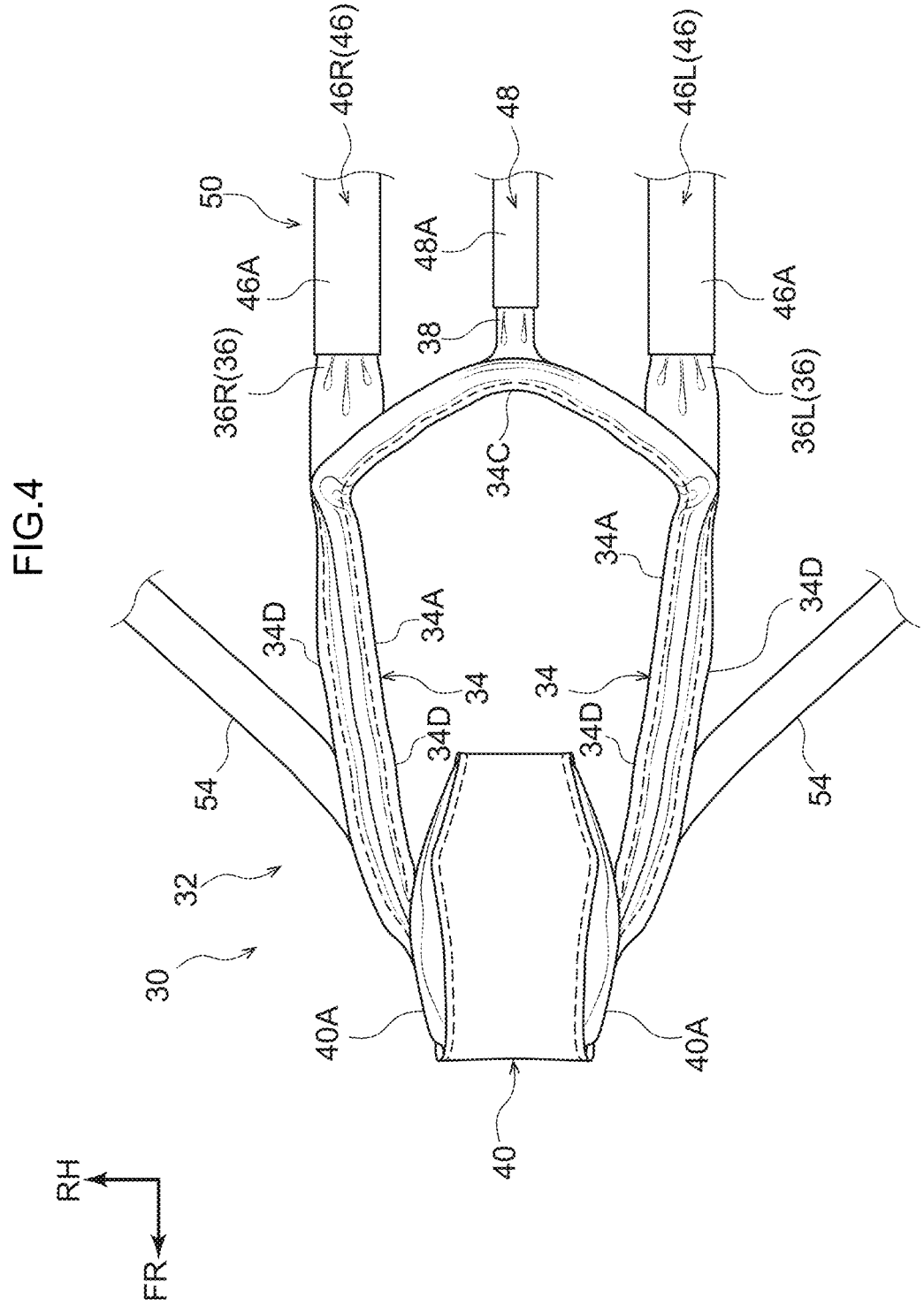
FIG. 4 is a schematic plan view illustrating a shape of an airbag of the present exemplary embodiment prior to being folded up.

As illustrated in FIG. 4, the pair of front-rear chambers 34 includes a left-right pair of front-rear extension portions 34A, a front coupling portion 34B and a rear coupling portion 34C. The left-right pair of front-rear extension portions 34A are expanded and deployed toward the front side via the left and right sides of the head H of the passenger D so as to extend in the front-rear direction by being supplied with gas ejected from the inflator 44. The front coupling portion 34B (see FIG. 1 to FIG. 3) connects front end portions of the pair of front-rear extension portions 34A together in the left-right direction. The rear coupling portion 34C connects rear end portions of the pair of front-rear extension portions 34A together in the left-right direction.

The front coupling portion 34B is connected to the pair of front-rear extension portions 34A to form a bag shape having a substantially T-shaped profile (see FIG. 1 to FIG. 3). Cylindrical shaped basal portions 36 extending rearward are integrally formed at the respective two seat width direction end portions of rear end portions of the pair of front-rear chambers 34 (the front-rear extension portions 34A), in other words, at a rear face of the rear coupling portion 34C. A cylindrical shaped basal portion 38 extending rearward is also integrally formed at a seat width direction central portion of the rear face of the rear coupling portion 34C.

Note that in the following description the basal portion 36 on the left side is called the "basal portion 36L" and the basal portion 36 on the right side is called the "basal portion 36R". Ejection ports 46A, 48A of respective branch pipes of distribution piping (diffuser) 50 (described later) are configured to be respectively connected to the left-right basal portions 36 and the central basal portion 38. Moreover, the front-rear chambers 34 are each formed in an elongated bag shape (tube shape) by overlapping two elongated strips of base cloth on each other and sewing upper and lower peripheral edge portions thereof together.

The airbag body 40 is, by being supplied with gas from the pair of front-rear chambers 34 after having moved toward the front side through between the head H of the passenger D and the ceiling 28 of the vehicle cabin (see FIG. 12 to FIG. 14) accompanying expansion and deployment of the pair of front-rear chambers 34 (the front-rear extension portions 34A), configured to be disposed at a rear side of the front coupling portion 34B between the pair of front-rear chambers 34 (the front-rear extension portions 34A) and at the front side of the passenger D by being expanded and deployed toward the passenger D side (rearward) with a delay from the pair of front-rear chambers 34.

The airbag body 40 is formed in a bag shape by folding a single piece of base cloth into a specific shape and sewing peripheral edge portions thereof together. A periphery of a communication hole (omitted in the drawings) formed in a rear face of a left-right direction central portion of the base cloth configuring the front coupling portion 34B of the front-rear chambers 34, and a periphery of a communication hole (omitted in the drawings) formed in the base cloth of the airbag body 40, are both connected together by being sewn. Note that the base cloth of the front-rear chambers 34 and the base cloth of the airbag body 40 are respectively configured from, for example, a polyamide-based or poly- ester-based fabric.

Moreover, as illustrated in FIG. 4, the airbag body 40 is configured to be, prior to being packed (rolled) in a roll shape, squashed substantially flat with left and right side base cloths 40A tucked inward in the seat width direction pulled out toward the seat width direction outside. Then, as illustrated in FIG. 4, the pair of front-rear chambers 34 are, prior to being folded up in a concertina shape, squashed substantially flat with a height direction substantially central portion of respective base cloths 34D are pulled toward the seat width direction outside.

Figure 5A:
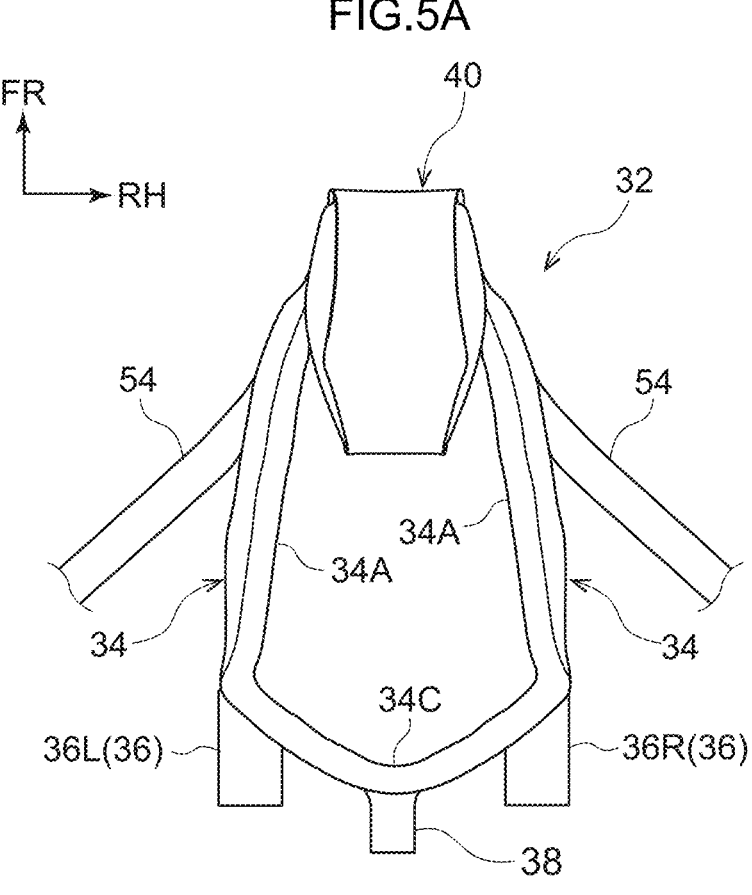
FIG. 5A to FIG. 5F are schematic plan views illustrating a process of folding up the airbag of the present exemplary embodiment.
Figure 5B:
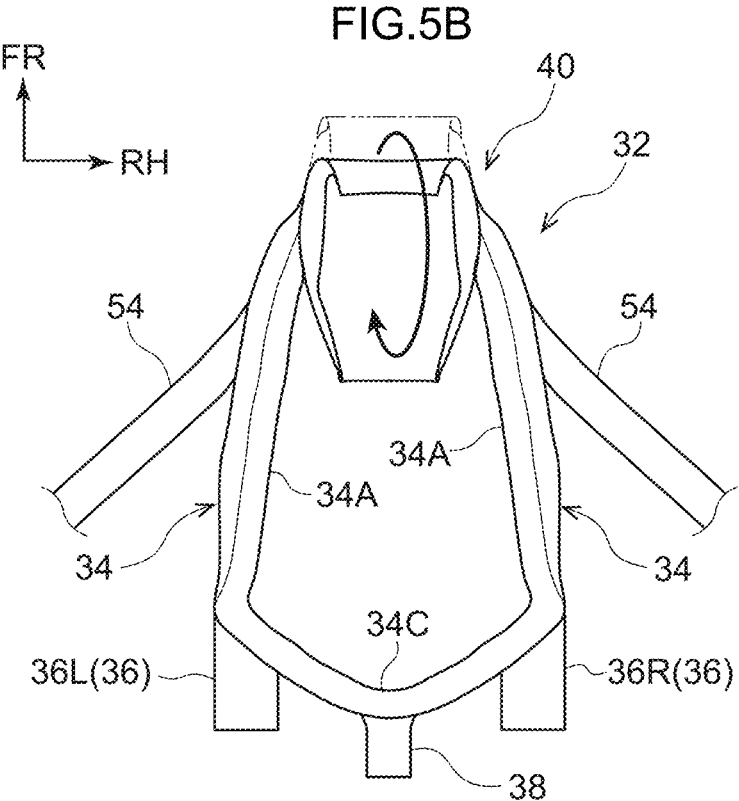
Figure 5C:
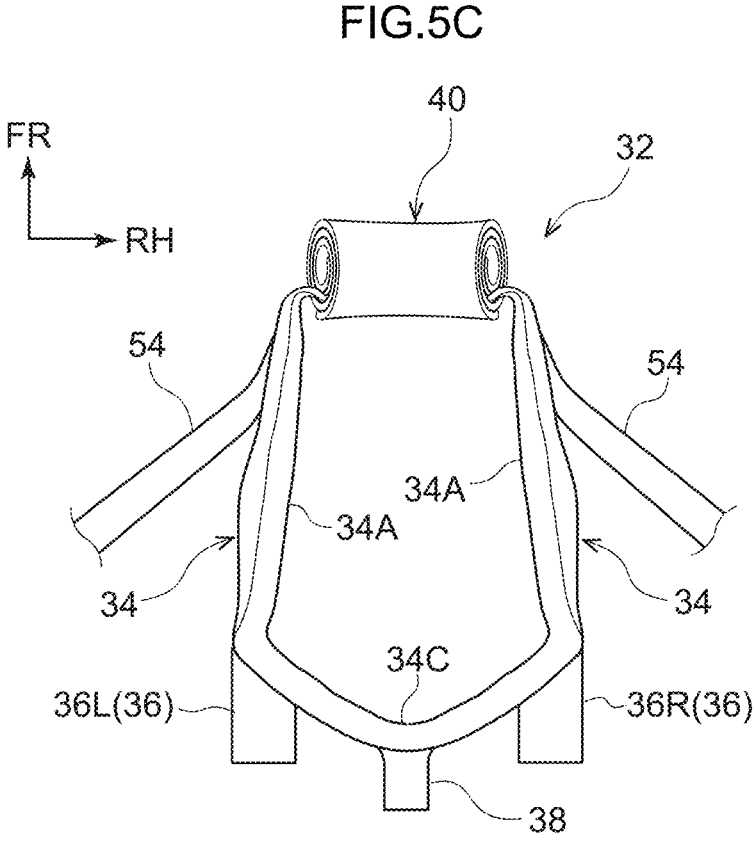

The airbag 32 folded up in this state, as illustrated in FIG. 5A to FIG. 5F. Namely, the airbag body 40 is first packed in a roll shape from the front side thereof, as illustrated in FIG. 5A to FIG. 5C. In other words, the airbag body 40 is packed up in a roll shape rolled from the outside so as to be easily unraveled by force due to inertia, accompanying forward movement.

Figure 5D:
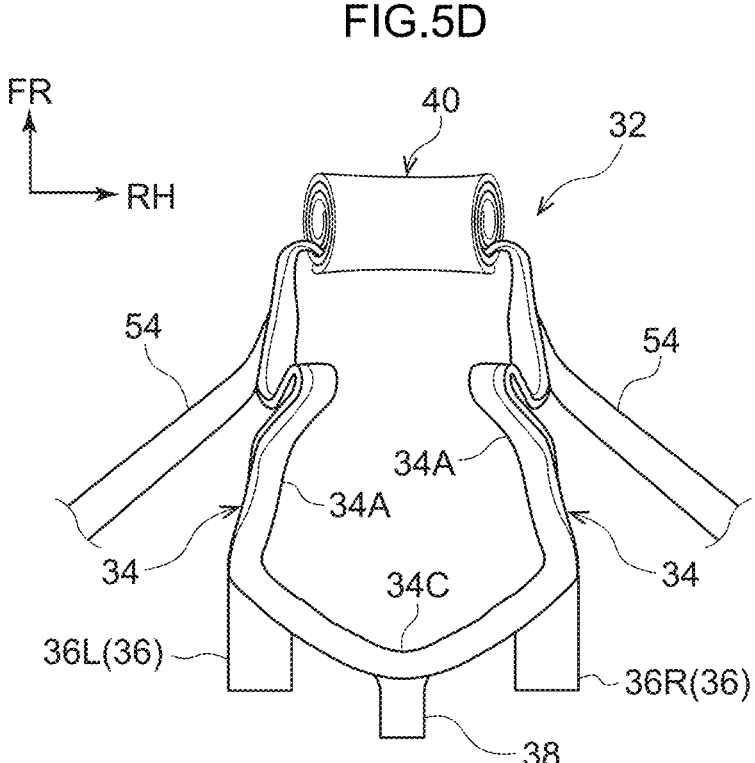
Figures 5E, 5F:
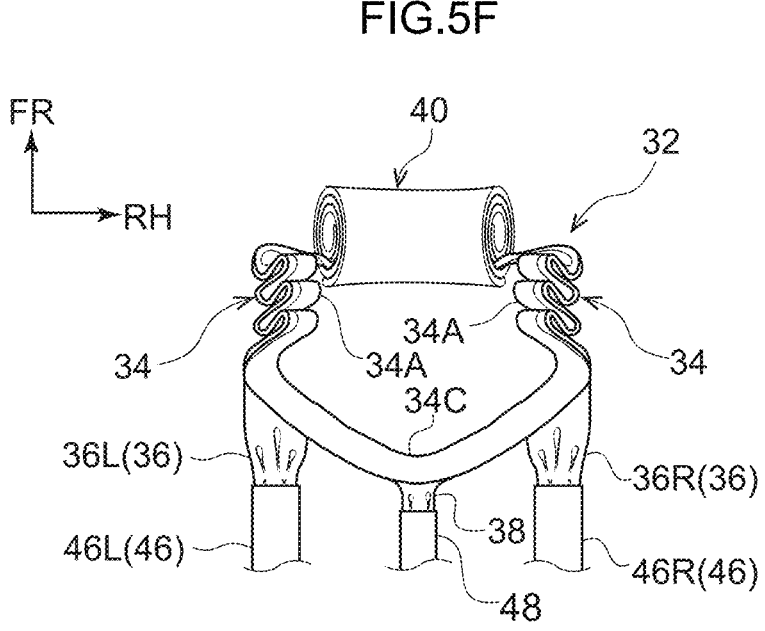

Next, as illustrated in FIG. 5D to FIG. 5F, the pair of front-rear chambers 34 (the front-rear extension portions 34A) are folded up in a concertina shape. Note that, the concertina folding of the pair of front-rear chambers 34 (the front-rear extension portions 34A) is concertina folding in which 3 individual mountain portions are formed. FIG. 5F illustrates a connected state of respective branch pipes 46, 48 of the distribution piping 50, described later.

Figure 6:
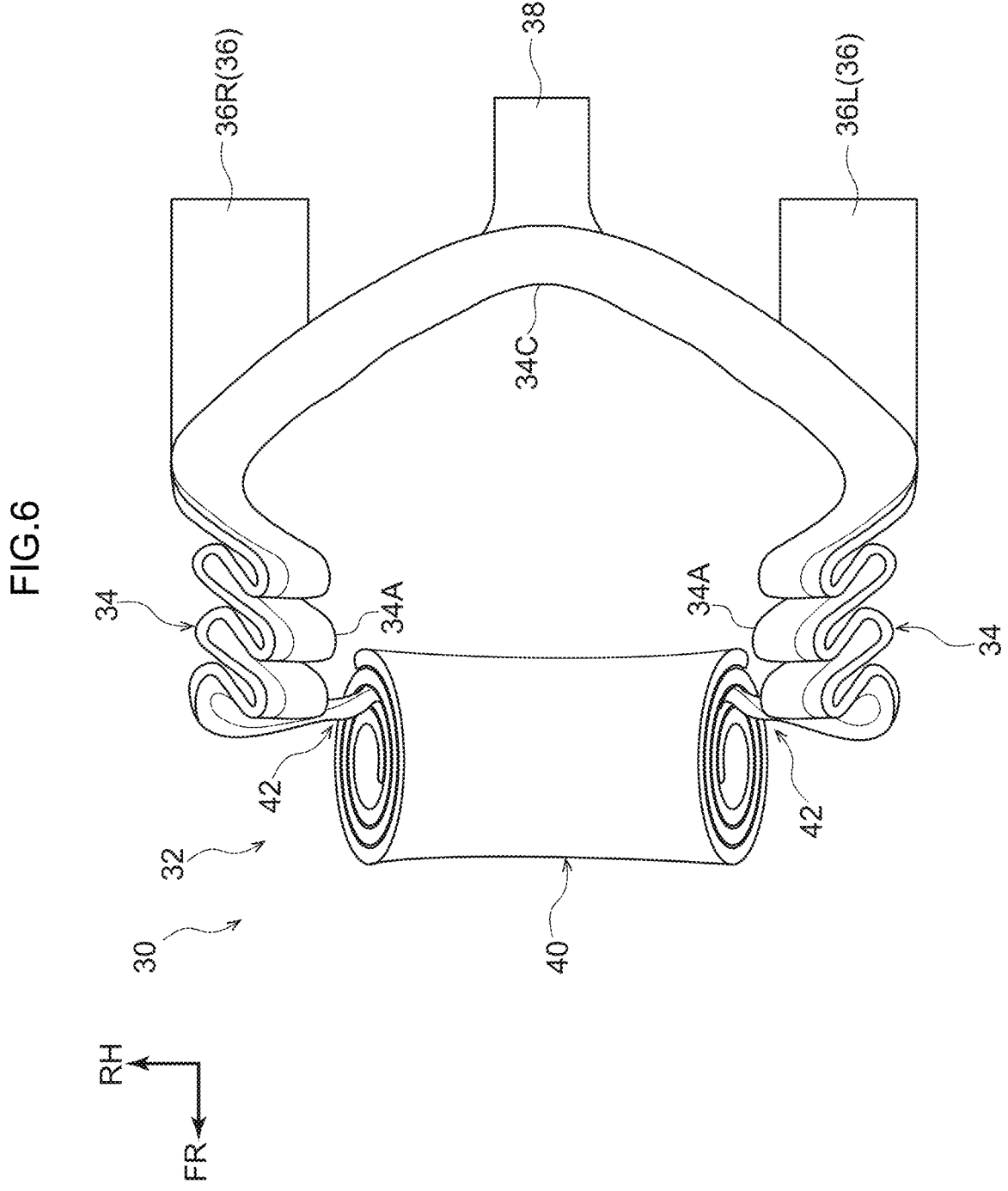
FIG. 6 is a schematic plan view illustrating a shape of an airbag of the present exemplary embodiment after being folded up.

In such a folded state as illustrated in FIG. 6, boundary portions 42 between the airbag body 40 folded in a roll shape and the pair of front-rear chambers 34 folded in a concertina shape configure fold-line portions, such that the pair of front-rear chambers 34 are fold-bent downward. The airbag 32 is then housed inside the headrest 18, as illustrated in FIG. 7, in a state in which the pair of front-rear chambers 34 folded in a concertina shape have been fold-bent downward with respect to the airbag body 40 folded in a roll shape.

Namely, the airbag 32 is disposed along an external profile (upper face and left and right faces) of the headrest 18 when viewed from the front. Note that, a non-illustrated tear line is formed in a front face of the headrest 18. This tear line is configured to rupture on receipt of expansion pressure of the airbag 32 during expansion and deployment of the airbag 32. The airbag 32 is thereby able to be expanded and deployed from the front face of the headrest 18 toward the front side in a sequence of the pair of front-rear chambers 34 and then the airbag body 40.

Moreover, as illustrated in FIG. 8, the resin or metal distribution piping 50 is disposed at a rear portion side of the inside of the headrest 18. The distribution piping 50 is branched in 3 directions, and includes cylindrical shaped branch pipes 46 respectively branching left and right from a seat width direction central portion thereof, and a cylindrical shaped branch pipe 48 branching upward from the seat width direction central portion thereof. Note that, in the following description, the branch pipe 46 branched toward the left from the seat width direction central portion of the distribution piping 50 is sometimes referred to as the "branch pipe 46L", and the branch pipe 46 branched toward the right from the seat width direction central portion of the distribution piping 50 is sometimes referred to as the "branch pipe 46R".

As illustrated in FIG. 9, an ejection port 46A of the left branch pipe 46L and an ejection port 46A of the right branch pipe 46R extend with a specific length respectively forward and upward at a specific angle (for example at 20° to 30° with respect to the horizontal direction) in side view. An ejection port 48A of the upper branch pipe 48 also extends with a specific length respectively forward and upward at a specific angle (for example at 20° to 30° with respect to the horizontal direction) in side view.

Note that the "specific length" of the ejection ports 46A and the ejection port 48A is preferably, for example, from 30 mm to 40 mm. This is because, there is a concern that gas may not be ejected in the intended direction when the length of the ejection ports 46A and the ejection port 48A is shorter than 30 mm, and because there is a needless increase in the thickness of the headrest 18 when the length is longer than 40 mm.

Figure 10:
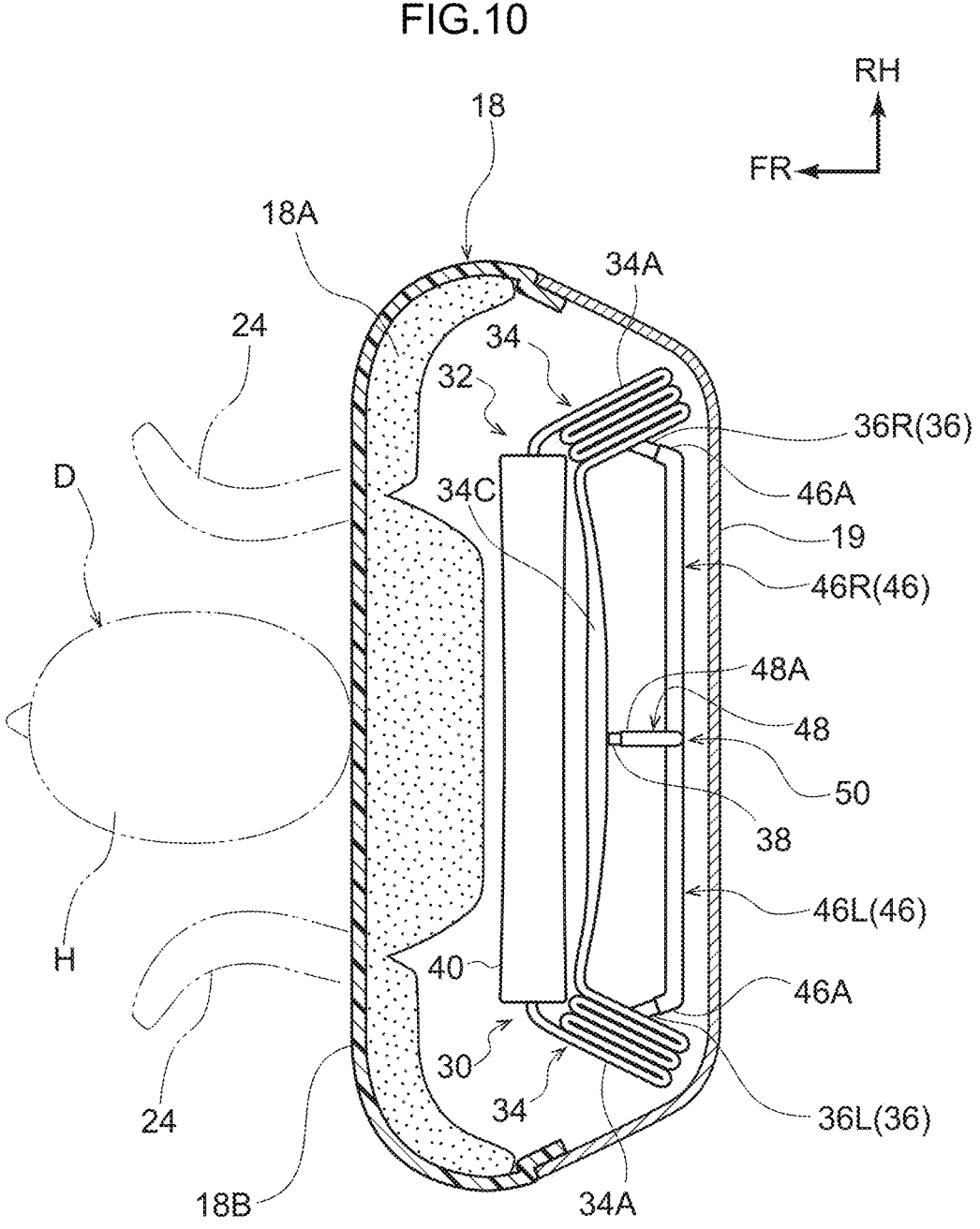
FIG. 10 is a schematic plan view illustrating a partial cross-section of an airbag housed in a headrest of the present exemplary embodiment.
Figure 11:
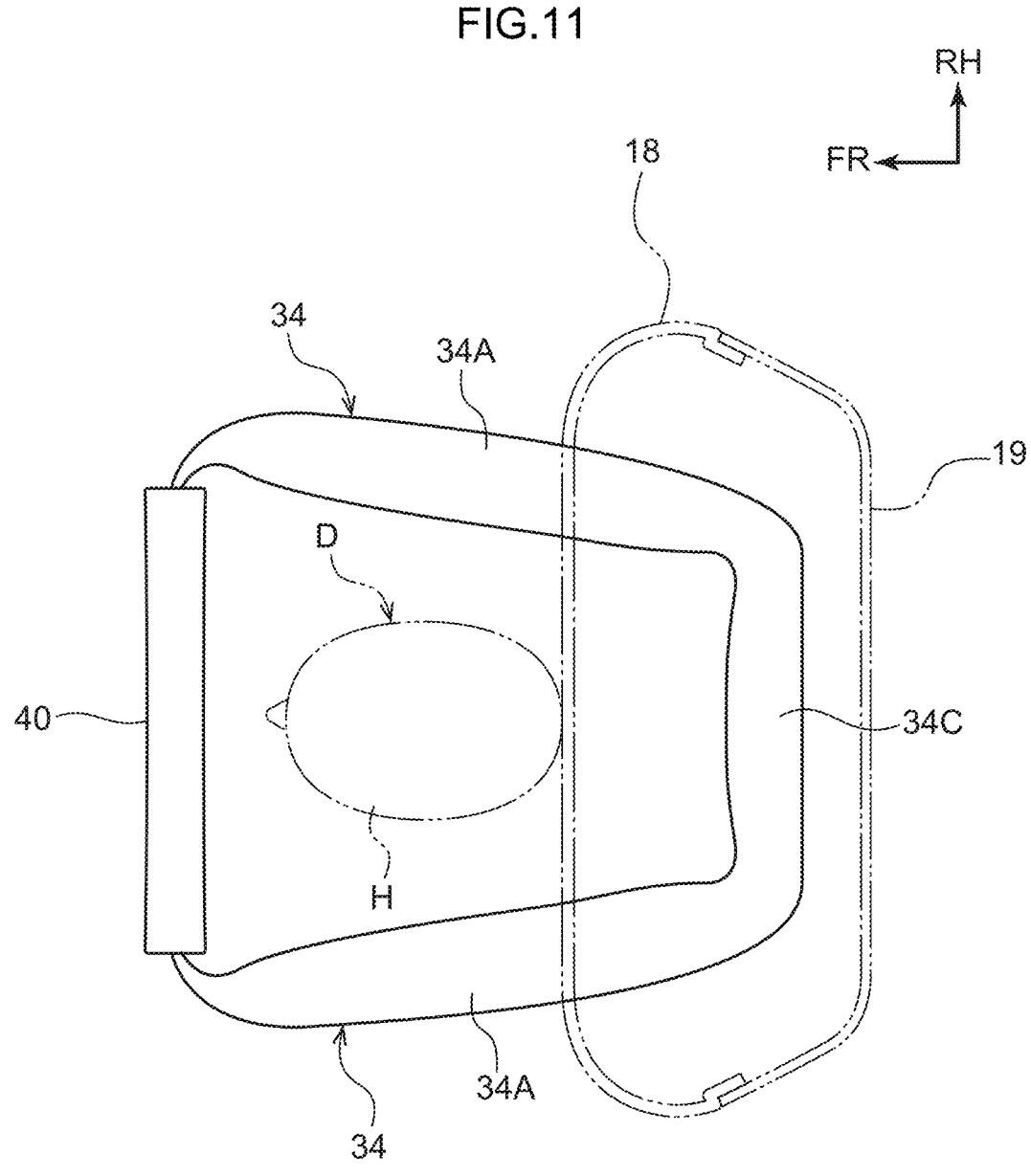
FIG. 11 is a schematic plan view illustrating an airbag of the present exemplary embodiment in a state partway through being expanded and deployed from a headrest.

Moreover, as illustrated in FIG. 10, the ejection port 46A of the left branch pipe 46L and the ejection port 46A of the right branch pipe 46R also extend toward the seat width direction outside and forward, at a specific angle (for example at 10° to 20° with respect to the front-rear direc- tion) in plan view. Thus, as illustrated in FIG. 11, the pair of front-rear chambers 34 are expanded and deployed toward the seat width direction outside and forward, such that the roll-shaped airbag body 40 is configured to move from the rear side toward the front side while being pulled toward the seat width direction outside.

As illustrated in FIG. 4 and FIG. 5F, the ejection port 46A of the left branch pipe 46L and the ejection port 46A of the right branch pipe 46R are respectively connected to the left basal portion 36L and the right basal portion 36R of the rear coupling portion 34C, and the ejection port 48A of the upper branch pipe 48 is connected to the central basal portion 38 of the rear coupling portion 34C. Note that, as illustrated in FIG. 9, for the airbag 32 in a state housed inside the headrest 18, the left and right basal portions 36L, 36R (only the left basal portion 36L is illustrated in FIG. 9) are respectively positioned at a height direction substantially central portion at the rear side of the pair of front-rear chambers 34.

In other words, the ejection port 46A of the left branch pipe 46L and the ejection port 46A of the right branch pipe 46R (only the left branch pipe 46L is illustrated in FIG. 9) are respectively positioned, in side view, at height direction substantially central portions at the rear side of the pair of front-rear chambers 34. Moreover as illustrated in FIG. 8, inner diameters of the ejection port 46A of the left branch pipe 46L and of the ejection port 46A of the right branch pipe 46R are the same as each other, and are formed greater (for example 1.2 times greater) than the inner diameter of the ejection port 48A of the upper branch pipe 48.

Moreover, the ejection port 44A of the inflator 44 is connected to a cylindrical shaped base portion 52 extending downward from a seat width direction central portion of the distribution piping 50. Namely, the inflator 44 ejects gas inside the left branch pipe 46L and the right branch pipe 46R of the distribution piping 50, capable of supplying gas respectively toward the pair of front-rear chambers 34, and also ejects gas inside the upper branch pipe 48 of the distribution piping 50, capable of supplying gas to the center of the rear coupling portion 34C.

Moreover, the tear line (omitted in the drawings) formed to the front face of the headrest 18 ruptures on receipt of expansion pressure of the pair of front-rear chambers 34, during expansion and deployment of the pair of front-rear chambers 34 of the airbag 32, as illustrated in FIG. 10. Thereby portions of the left and right sides of the front face of the headrest 18 are configured to turn in toward the head H of the passenger D (toward the seat width direction inside), with these turned-in sites configuring left and right airbag doors 24. Namely, a configuration is achieved in which parts of a pad 18A, formed from urethane foam or the like and configuring the headrest 18, and parts of a cover 18B overlaid on the pad 18A, configure the airbag doors 24.

Note that, as illustrated in FIG. 9, an upper part of the front face of the headrest 18 is also configured to turn in toward the head H of the passenger D (downward) when the airbag body 40 of the airbag 32 has ruptured the tear line (omitted in the drawings) formed to the front face of the headrest 18, and this turned in site configures the airbag door 24.

As illustrated in FIG. 1 to FIG. 3, in the airbag device 30 configured as described above, the front-rear extension portions 34A of the expanded and deployed pair of front-rear chambers 34 extend in the front-rear direction at the left and right sides of the head H of the passenger D, so as to oppose the head H from both the left and right sides thereof, separated from the head H by respective gaps. The front end portions of the expanded and deployed pair of front-rear extension portions 34A are in a state connected together in the left-right direction by the expanded and deployed front coupling portion 34B. This means that the front-rear chamber 34 including the pair of front-rear extension portions 34A and the front coupling portion 34B projecting from the headrest 18 is configured in a substantially U-shape open toward the rear in plan view (see FIG. 3).

Moreover, the airbag body 40 is configured to expanded and deployed toward the rear side (toward the passenger D side), by being supplied with gas from the front-rear chambers 34, after the airbag body 40 has moved toward the front side along with the expansion and deployment of the pair of front-rear chambers 34. Namely, as illustrated in FIG. 11, the airbag body 40 is configured to remain in a state packed in the roll shape during the expansion and deployment of the pair of front-rear chambers 34, and to pass from the rear toward the front side through the narrow gap between the head H of the passenger D and a ceiling 28 of the vehicle cabin (see FIG. 12 to FIG. 14).

The airbag body 40 is configured to expand and deploy toward the passenger D side (rearward) at the rear side of the front coupling portion 34B, delayed with respect to the pair of front-rear chambers 34, with the expanded and deployed airbag body 40 configured to face toward the head H, the chest C, and the belly B of the passenger D, separated by a gap therefrom in the front-rear direction (see FIG. 1 to FIG. 3). Note that, the airbag body 40 is set with a shape, such that, when expanded and deployed, the airbag body 40 is sandwiched between the thighs F and the chest C of the passenger D from an intermediate-stage to a later-stage during passenger restraint.

Moreover, as illustrated in FIG. 1 to FIG. 3, a left and right pair of rear tethers 54, a left and right pair of front-upper tethers 56, and a left-right pair of front-lower tethers 58 are attached to the airbag 32. The rear tethers 54, the front-upper tethers 56, and the front-lower tethers 58 are, for example, configured in elongated belt shapes from a poly-amide-based or polyester-based fabric. The fabric configuring the rear tethers 54, the front-upper tethers 56, and the front-lower tethers 58 is configured to be less extensible than the base cloth configuring the front-rear chamber 34. The extensibility is adjusted by the substance, thickness, and the like of the fabric.

The pair of front-upper tethers 56 are configured to couple wall faces at the left and right sides of a front side of an upper portion of the airbag body 40 expanded and deployed further upward than the front-rear chamber 34, to respective front portions of the pair of front-rear extension portions 34A. Namely, respective one-end portions of the pair of front-upper tethers 56 are sewn to wall faces of the left and right sides of the front side of the upper portion of the airbag body 40, expanded and deployed further upward than the front-rear chamber 34. Each of the other-end portions of the pair of front-upper tethers 56 is sewn to the respective front portion of the pair of front-rear extension portions 34A.

The pair of front-lower tethers 58 are configured to couple wall faces at the left and right sides of a front side of a lower portion of the airbag body 40 expanded and deployed further downward than the front-rear chamber 34, to respective front portions of the pair of front-rear extension portions 34A. Namely, each of the one-end portions of the pair of front-lower tethers 58 is sewn to the respective wall faces at the left and right sides of the lower portion of the airbag body 40, expanded and deployed further downward than the front-rear chamber 34. Each of the other-end portions of the pair of front-lower tethers 58 is sewn to the respective front portion of the pair of front-rear extension portions 34A.

Moreover, each of one-end portions of the pair of rear tethers 54 is attached by being sewn to a lower face of a front portion of the front-rear chambers 34 (the front-rear extension portions 34A) opposing a substantially central portion, in side view of the expanded and deployed airbag body 40, in the seat width direction. Each of the other-end portions of the pair of rear tethers 54 is attached to a respective side portion of the seatback 16 (or to a non-illustrated vehicle body at a rear side of the passenger D). Thus the pair of rear tethers 54 extend obliquely rearward and downward at a lower side of the pair of front-rear extension portions 34A in an expanded and deployed state of the airbag 32.

Namely, the pair of rear tethers 54 adopt an inclined orientation facing obliquely rearward and downward in side view. This results in a configuration in which, during restraint of the passenger D by the airbag 32, the airbag body 40 is pulled (drawn) obliquely relatively rearward and downward by the pair of rear tethers 54, and, in side view, the airbag body 40 and front portions of the pair of front-rear extension portions 34A are pulled obliquely relatively rearward and downward about a center of rotation of the headrest 18.

Action of the airbag device 30 according to the present exemplary embodiment configured as described above will next be described.

In the airbag 32 including the pair of front-rear chambers 34 and the airbag body 40, the pair of front-rear chambers 34, that are present at the two seat width direction end portions thereof, are fold-bent downward along the external profile of the headrest 18 when viewed from the front, and are housed in the headrest 18. Namely, the airbag 32 is housed compactly inside the headrest 18.

Note that, the pair of front-rear chambers 34 are fold-bent downward from the boundary portions 42 to the airbag body 40. These boundary portions 42 are portions having the lowest rigidity in the folded-state airbag 32. This means that the pair of front-rear chambers 34 are readily fold-bent downward from the boundary portions 42, facilitating a task to install the airbag 32 inside the headrest 18 in this state.

Moreover, the headrest 18 housing the airbag 32 is integrally formed to the seatback 16. This thereby enables the airbag 32 (the airbag device 30) to be prevented from coming away from the vehicle seat 12, better than cases in which the headrest 18 is formed as a separate body from the seatback 16.

The inflator 44 is actuated under control of the control device when a vehicle head-on collision is detected (or foreseen) by the collision sensors. Namely, gas is generated and ejected from the inflator 44. The gas ejected from the inflator 44 is supplied through the distribution piping 50 into the pair of front-rear chambers 34 and the rear coupling portion 34C of the airbag 32.

The inflator 44 is a single inflator disposed along the extension direction of the seatback 16 of the vehicle seat 12, and ejects gas into the distribution piping 50, capable of supplying gas respectively to the pair of front-rear chambers 34 (the left and right basal portions 36L, 36R) and to the rear coupling portion 34C (the central basal portion 38).

This thereby enables the headrest 18 and the seatback 16 to be suppressed from becoming more bulky (from having an increased thickness), compared to cases in which there are ejection ports 44A of respective inflators 44 directly connected to the pair of front-rear chambers 34 (the left and right basal portions 36L, 36R) and the rear coupling portion 34C (the central basal portion 38), namely cases in which there are three inflators 44 provided along directions that intersect with the extension direction of the seatback 16 in side view (projecting obliquely rearward and downward), thereby enabling a reduction to be achieved in the manufacturing cost.

Figure 12:
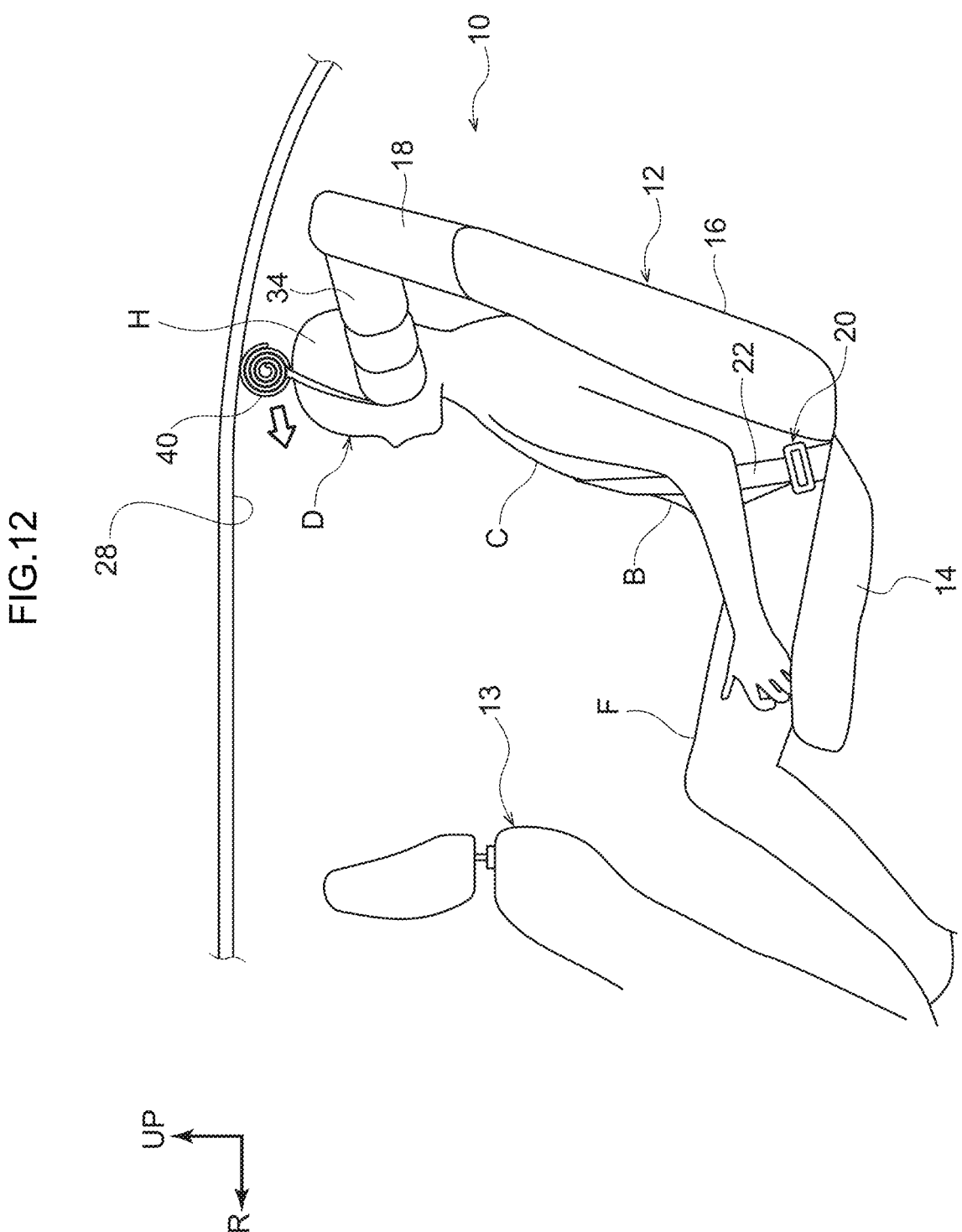
FIG. 12 is a schematic side view illustrating an airbag of the present exemplary embodiment at an initial-stage of being expanded and deployed.

Thus, when gas is supplied to the pair of front-rear chambers 34, the tear line in the headrest 18 ruptures on receipt of expansion pressure of the pair of front-rear chambers 34, and, as illustrated in FIG. 12, the pair of front-rear chambers 34 are expanded and deployed from the front face of the headrest 18 toward the front side via the left and right sides of the head H of the passenger D.

When this occurs, each of the ejection ports 46A of the left and right branch pipes 46L, 46R connected to the left and right basal portions 36L, 36R of the pair of front-rear chambers 34 extend with a specific length at a specific angle toward the seat width direction outside and forward in plan view. Accordingly, the pair of front-rear chambers 34 are also expanded and deployed in the intended direction toward the seat width direction outside and forward.

This means that, even though the pair of front-rear chambers 34 of the airbag 32 housed in the headrest 18 are fold-bent downward with respect to the airbag body 40, the front-rear chambers 34 are deployed while unfolding such fold-bends, when being expanded and deployed. Thus, the expansion and deployment performance of the pair of front-rear chambers 34 of the airbag 32 may be secured even when there is left-right direction variation in the position of the head H of the passenger D.

Moreover, the left and right airbag doors 24 formed by rupturing parts of the headrest 18 turn in toward the head H of the passenger D (toward the seat width direction inside), during expansion and deployment of the pair of front-rear chambers 34. This means that the head H of the passenger D can be moved toward the seat width direction center by the left and right airbag doors 24, and the expansion and deployment of the pair of front-rear chambers 34 may be prevented from being impeded by the head H of the passenger D.

Moreover, when gas is supplied to the rear coupling portion 34C, the tear line of the headrest 18 receives expansion pressure of the rear coupling portion 34C via the airbag body 40, namely receives pressing force of the expanded rear coupling portion 34C pressing the airbag body 40 in a roll-shape packed state toward the front side, and accordingly ruptures.

The airbag body 40 that is being pressed toward the front side by the expanded rear coupling portion 34C moves toward the front side via the upper side of the head H of the passenger D, as the pair of front-rear chambers 34 are being expanded and deployed. Note that, the pair of front-rear chambers 34 are expanded and deployed toward the seat width direction outside and forward when this occurs, and so the airbag body 40 moves toward the front side while being pulled toward the seat width direction outside.

Moreover, as described later, the gas from the inflator 44 is supplied to the airbag body 40 through the communication hole of the front coupling portion 34B, after the expansion and deployment of the pair of front-rear chambers 34 has been completed. Namely, the gas ejected from the inflator 44 that has flowed through the pair of front-rear extension portions 34A and the front coupling portion 34B is supplied into the airbag body 40 through the communication holes. This accordingly enables the airbag body 40 to be expanded and deployed with a sufficient delay with respect to the pair of front-rear chambers 34.

Accompanying the expansion and deployment of the pair of front-rear chambers 34, the airbag body 40 can accordingly reliably and easily be passed from the rear side to the front side through the narrow gap between the head H of the passenger D and the ceiling 28 of the vehicle cabin while remaining in a state packed in a roll shape. This means that a malfunction, in which the airbag body 40 becomes stuck in this narrow gap, may be prevented from occurring, enabling improper deployment of the airbag 32 to be either suppressed or prevented from occurring.

In this manner, the airbag 32 according to the present exemplary embodiment enables the airbag 32 including the airbag body 40, which is disposed at the front side of the passenger D by being expanded and deployed through the narrow gap between the head H of the passenger D and the ceiling 28 of the vehicle cabin, to housed compactly inside the headrest 18 without the deployment performance thereof being impeded. This thereby enables the headrest 18 to be suppressed from becoming bulky in both face-on view and side view, enabling the rearview visibility of the passenger D to be suppressed from falling.

Figure 13:
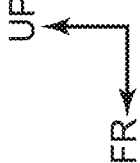
FIG. 13 is a schematic side view illustrating an airbag of the present exemplary embodiment at an intermediate-stage of being expanded and deployed.

Thus, when the pair of front-rear chambers 34 are expanded and deployed and the airbag body 40 is moved toward the front side while in a state folded in a roll shape, relatively speaking the head H of the passenger D is inserted into a portion of space surrounded by the front-rear extension portions 34A of the pair of front-rear chambers 34 and by the roll-shape folded state airbag body 40, as illustrated in FIG. 13.

Figure 14:
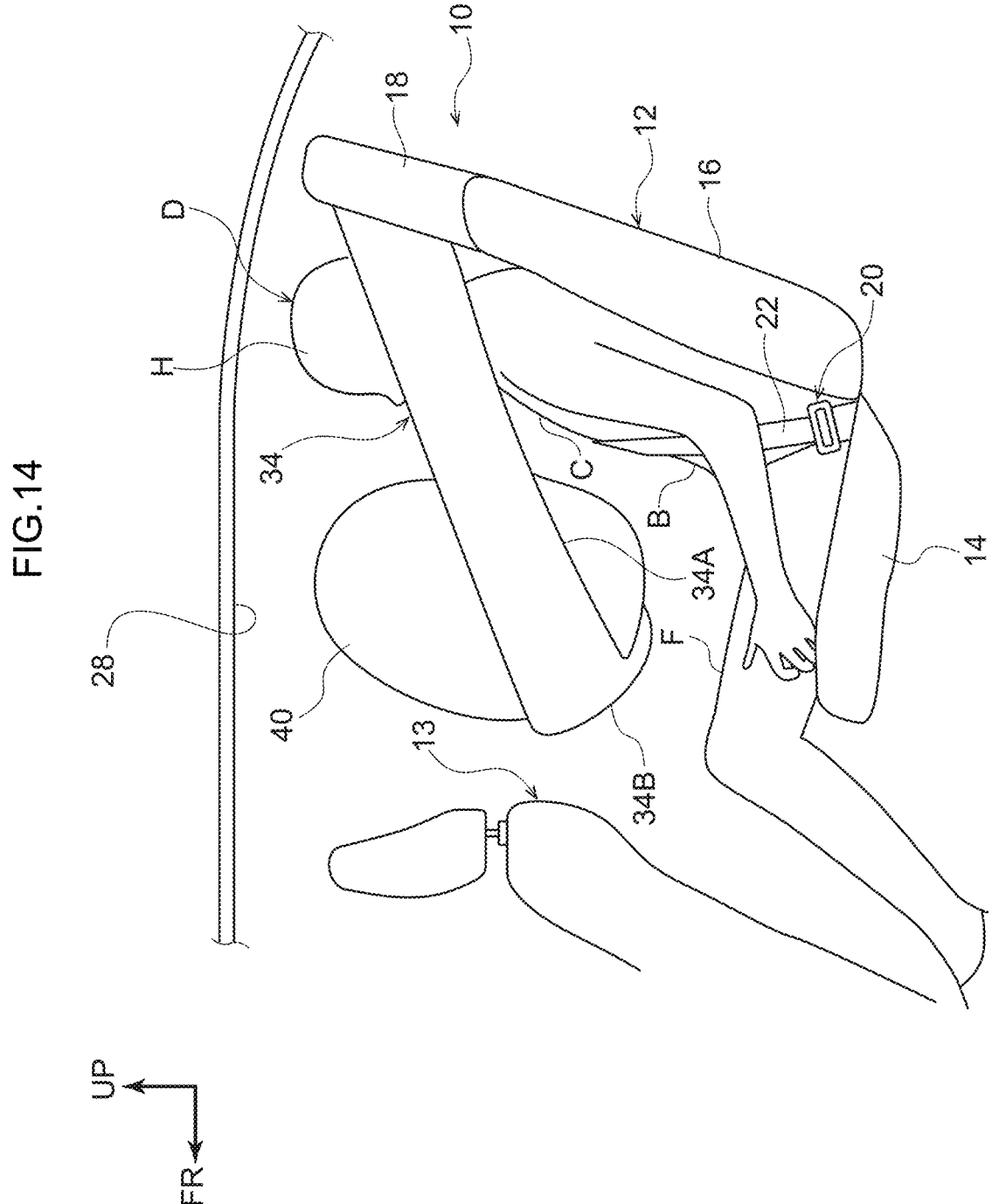
FIG. 14 is a schematic side view illustrating an airbag of the present exemplary embodiment at a later-stage of being expanded and deployed.

Then, as illustrated in FIG. 14, the airbag body 40 is expanded and deployed toward the passenger D side by gas being supplied through the communication holes from the front coupling portion 34B connecting the front end portions of the front-rear extension portions 34A of the pair of front-rear chambers 34 together in the left-right direction. Namely, the airbag body 40 is disposed between the pair of front-rear chambers 34 and at the front side of the passenger D.

Note that, during expansion and deployment of the airbag body 40, the pair of front-upper tethers 56 respectively couple left-right side locations at the front side of an upper portion of the airbag body 40 to front portions of the pair of front-rear extension portions 34A. The pair of front-upper tethers 56 enable unintended upward displacement (rotation) of the airbag body 40 with respect to the front-rear chamber 34 about the front coupling portion 34B to be suppressed, when the airbag body 40 (the airbag 32) has been completely expanded and deployed.

Moreover, during expansion and deployment of the airbag body 40, the pair of front-lower tethers 58 couple locations at the left and right sides of a front side of the lower portion of the airbag body 40 to the front portions of the pair of front-rear extension portions 34A. The pair of front-lower tethers 58 are able to suppress unintended downward displacement (rotation) of the airbag body 40 with respect to the front-rear chamber 34 about the front coupling portion 34B, when the airbag body 40 (the airbag 32) has been completely expanded and deployed.

Moreover, the pair of rear tethers 54 also extends obliquely rearward and downward at a lower side of the pair of front-rear extension portions 34A, when the airbag 32 has been completely expanded and deployed. Namely, the pair of rear tethers 54 limits the airbag body 40 from moving obliquely forward and upward. This accordingly may enable the airbag 32 to be suppressed from swinging in the height direction and in the front-rear direction (enables a contribution to the stability of the deployment behavior of the airbag body 40).

In this state, the passenger D who has moved toward the front side under inertia from the impact of the vehicle head-on collision is restrained by the airbag body 40. More specifically, during restraint of the passenger D, the front-rear chambers 34 (the front-rear extension portions 34A) are stretched toward the front side by movement of the passenger D toward the front side. The airbag body 40 is then compression deformed toward the front side by being pressed toward the front side by the passenger D.

This accordingly enables the energy absorption performance of the airbag body 40 to be improved, and enables the passenger restraint performance of the airbag body 40 to be effectively secured. Namely, in cases in which both the front-rear chamber 34 and the airbag body 40 receive tensional load, the load from the airbag body 40 imparted to the passenger D increases, however the load imparted to the passenger D may be decreased somewhat by compression deformation of the airbag body 40.

Moreover, the airbag body 40 is set with a shape so as to be sandwiched between the thighs F and the chest C of the passenger D from an intermediate-stage to a later-stage during passenger restraint by the airbag 32, and so this enables contact with the upper body of the passenger D over a wide surface area. The load from the airbag body 40 imparted to the passenger D may accordingly be reduced significantly.

The airbag body 40 is also expanded and deployed toward the passenger D side at the rear side of the front coupling portion 34B after the expansion and deployment of the front-rear chamber 34, and so a gap between the airbag body 40 and the passenger D becomes small. The passenger D is thereby restrained at an early-stage by the airbag body 40, which may enable an improvement in the initial-stage passenger D restraint performance by the airbag body 40.

Moreover, the pair of rear tethers 54 are less extensible than the front-rear chambers 34, and so the airbag body 40 is pulled in relatively obliquely rearward and downward by the pair of rear tethers 54 during restraint of the passenger D. This thereby enables the height direction position of the airbag body 40 with respect to the head H of the passenger D to be stabilized during restraint of the passenger. Namely, the airbag 32 is able to appropriately restrain the passenger D.

Although the seat-mounted airbag device 30 according to the present exemplary embodiment has been described with reference to the drawings, the seat-mounted airbag device 30 according to the present exemplary embodiment is not limited to that illustrated in the drawings, and appropriate design changes may be made within a range not departing from the spirit of the present disclosure. For example, the shape of the airbag 32 is not limited to the shape illustrated.

Moreover, the distribution piping 50 may be provided to straddle between the inside of the headrest 18 and the inside of the seatback 16. Although each of the basal portions 36, 38 illustrated is attached by being inserted inside the respective ejection port 46A, 48A, there is no limitation thereto, and a configuration may be adopted in which they are attached so as to cover the outside of the respective ejection ports 46A, 48A.

What is claimed is:

1. A seat-mounted airbag device comprising:
an inflator that is provided at a vehicle seat and that ejects gas during a vehicle collision; and
an airbag including an airbag body that, by being supplied with gas ejected from the inflator, moves toward a seat front side between a head of a passenger seated on the vehicle seat and a ceiling of a vehicle cabin, and is expanded and deployed, so as to be disposed at the seat front side of the passenger,
wherein the airbag includes the airbag body being packed up in a roll shape rolled from the outside and both seat width direction end portions folded into a concertina shape, and the both seat width direction end portions are fold-bent toward a seat downward side such that the airbag body and the both seat width direction end portions are housed in a headrest so as to follow an external profile of the headrest of the vehicle seat in face-on view seen from the seat front side.

2. The seat-mounted airbag device of claim 1, wherein:
the two seat width direction end portions of the airbag are a pair of front-rear chambers that, by being supplied with gas ejected from the inflator, expand and deploy toward the seat front side via both left and right sides of the head of the passenger; and
the airbag body moves toward the seat front side between the head of the passenger and the ceiling as the pair of front-rear chambers are being expanded and deployed, and the airbag body is expanded and deployed toward a seat rear side between the pair of front-rear chambers so as to be disposed at the seat front side of the passenger by being supplied with the gas from the pair of front-rear chambers.

3. The seat-mounted airbag device of claim 2, wherein the pair of front-rear chambers are fold-bent toward the seat downward side, from boundary portions with the airbag body.

4. The seat-mounted airbag device of claim 3, wherein the headrest is integrally formed with a seatback of the vehicle seat.

5. The seat-mounted airbag device of claim 4, wherein left and right airbag doors, that are formed by the headrest rupturing during expansion and deployment of the pair of front-rear chambers, are configured to turn in toward the head of the passenger.

6. The seat-mounted airbag device of claim 5, wherein the left airbag door is discontinuous with respect to the right airbag door.

7. The seat-mounted airbag device of claim 6, further comprising a top airbag door in the head rest, wherein the top airbag door is separate from each of the left and right airbag doors.

8. The seat-mounted airbag device of claim 4, wherein the inflator is a single inflator disposed along an extension direction of the seatback of the vehicle seat, and is configured to eject the gas toward an inside of distribution piping capable of supplying the gas respectively to the pair of front-rear chambers.

9. The seat-mounted airbag device of claim 8, wherein ejection ports of the distribution piping, that are connected to basal portions of the pair of front-rear chambers, each extend with a specific length toward a seat width direction outside and forward in plan view.

* * * * *